United States Patent Office 3,434,034
Patented Mar. 18, 1969

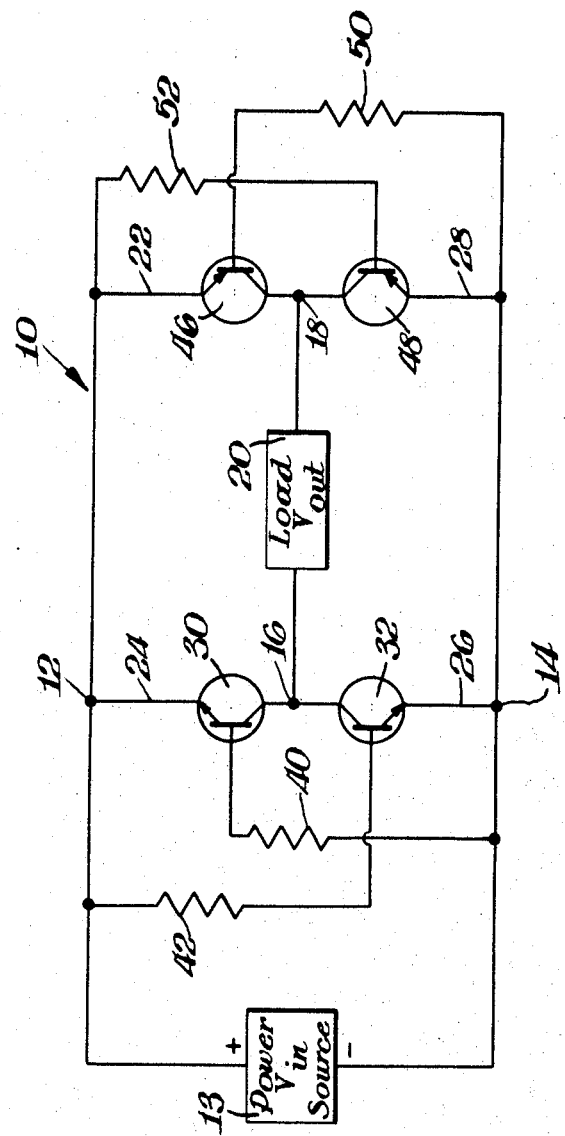

3,434,034
UNIVERSAL AC OR DC TO DC CONVERTER
Thomas Garber, Framingham, and William L. Kelleher, Newburyport, Mass., assignors to Hewlett-Packard Company, Palo Alto, Calif., a corporation of California
Filed Mar. 14, 1967, Ser. No. 623,038
U.S. Cl. 321—43    5 Claims
Int. Cl. H02m 3/14, 7/20

ABSTRACT OF THE DISCLOSURE

A transistor bridge is constructed to have a transistor in each leg of the bridge. By selecting majority carrier conductivity types of the transistors and selectively connecting their base electrodes to different ones of the input terminals of the bridge, a low voltage power converter is obtained. The circuit is effectively a two pole double throw switch synchronized with the power frequency down to and including direct current.

---

This invention relates to an efficient universal power converter circuit and, more particularly, to a universal power converter that will accommodate input power signals of either alternating or direct current.

It is known to employ a simple four way diode bridge for the purpose of converting direct current (D.C.) electrical power signals of either polarity or alternating current (A.C.) electrical power signals into D.C. electrical power. Unfortunately for low voltage applications the forward voltage drops of the diodes tend to be excessive. Because of these forward voltage drops across the diode or switching element, any changes in the condition of the switch such as those caused by temperature, variations in the diode, aging of the diode, etc., cause variations in the direct current voltage output level of the converter. For example, at an output voltage level of approximately 6 volts D.C., operating into an approximately 300 ohm load, as much as 0.6 of a volt may be lost due to the voltage drop of the diodes alone. This is approximately 10 percent of the output voltage. Additionally, this relatively high forward voltage drop across the diodes places a rather severe limitation upon the input power voltages with which the circuit may be used.

It is therefore an object of this invention to obviate many of the disadvantages of the prior art converter circuits.

Another object of this invention is to provide an improved low voltage power converter that is capable of efficiently converting low voltage signals of either polarity, as well as alternating current voltages, to a direct current voltage signal.

In a preferred embodiment of this invention, a transistor bridge network is arranged to have a transistor in each of the four arms of the bridge to selectively conduct current from the input terminals of the bridge to the bridge output terminals. The conductivity type of the transistors on one side of the bridge are of the same conductivity type but differ from the conductivity type of the transistors forming the other side of the bridge. Also, the base electrodes of the respective transistors are coupled to one or the other of the bridge input terminals such that the transistors in one set of opposite arms of the bridge are always biased to conduct current through the load circuit while the other set is biased off.

The novel features that are considered characteristic of this invention are set forth with particularity in the appended claims. The invention, itself, however, both as to its organization and method of operation, as well as additional objects and advantages thereof, will best be understood from the following description when read in connection with the accompanying drawings, in which the sole figure is a schematic circuit diagram of a low voltage universal power converter constructed in accordance with a preferred embodiment of this invention.

In the drawing there is seen a bridge circuit 10 having a pair of input terminals 12 and 14, respectively, and a pair of output terminals 16 and 18, respectively. Any desired load 20 may be connected across the output terminals 16, 18. In like manner, the input terminals 12, 14 are directly connected to a suitable source of input power to be converted to D.C. This input power may be unidirectional current of either polarity or it may be an A.C. source.

The bridge 10 has four arms 22, 24, 26, and 28, respectively. In each of the two arms forming one side of the bridge a pair of NPN transistors 30, 32, respectively, are connected in back-to-back relationship. Each of the NPN transistors 30 and 32 has collector, emitter, and base electrodes with the collector electrodes being connected to the first output terminal 16 and their respective emitter electrodes connected to the input terminals 12 and 14, respectively. The base electrode of the first NPN transistor 30 is connected through a suitable impedance, illustrated as a resistor 40, to the second input terminal 14. In like manner, the base electrode of the second NPN transistor 32 is connected through an impedance, illustrated as a resistor 42, to the first input terminal 12.

The other side of the bridge comprising the arms 22 and 28 includes a pair of PNP transistors 46 and 48, respectively, connected in back-to-back relationship. Each of the transistors 46 and 48 has a collector electrode, an emitter electrode, and a base electrode. The collector electrodes of these two transistors 46 and 48 are connected to the second output terminal 18 and their respective emitter electrodes are connected to the input terminals 12 and 14, respectively. In similar manner, the base electrode of the first PNP transistor 46 is connected through an impedance, illustrated as a resistor 50, to the second input terminal 14. The base electrode of the second PNP transistor 48 is connected through an impedance, illustrated as resistor 52, to the first input terminal 12.

With this arrangement the converter circuit is capable of efficiently converting relatively low voltages of either polarity or alternating current to a direct current voltage which is supplied to the load 20. If it is assumed for example, that the power from the source 13 is a D.C. signal, and of positive going polarity as indicated by the plus sign, the first PNP transistor 46 has its emitter-base junction forward biased and, in like manner, the second NPN transistor 32 has its emitter-base junction forward biased such that current is conducted from the bridge input terminal 12 through the first PNP transistor 46, through the load 20, and thence through the second NPN transistor 32 to the second bridge input terminal 14.

If on the other hand it is assumed that the power source is an alternating current source, on the positive going portion of the cycle, the load will receive current flowing through it in the conventional sense from the terminal 18. This current will flow from the terminal 16 through the transistors 46 and 32, respectively, as was the case with a positive going D.C. source. When the polarity of the A.C. signal reverses, transistors 32 and 46 are immediately switched off, and the emitter-base junctions of the first NPN transistor 30 and of the second PNP transistor 48 become forward biased through the respective biasing resistors 40 and 52, respectively. These transistors quickly saturate producing only a nominal voltage drop and permit the current to flow to the load 20 in the same direction as before. The load "sees" only a D.C. voltage signal.

It is thus seen that the power converter of this invention is capable of universally providing a D.C. output voltage whether the input be uni-directional or alternating current. Because of the switching characteristics of the transistors, which have a relatively low forward voltage drop when in saturation, there is little voltage drop across the transistor and also little change in voltage as a function of temperature as was the case in the prior art diode bridge circuits. For example, with a 6 volt input signal, a typical loss across the transistors is only 0.08 as compared 0.6 volt with diodes. Also the variations of the uni-directional voltage presented to the load as a function of temperature are reduced to about 0.002%/° F. as opposed to 0.06%/° F. with diodes. The relative magnitude of the input and output voltages are proportional to each other over a relatively wide range of voltage amplitudes and frequencies. The practical lower voltage limit of the circuit of this invention is about 2 volts which is determined by the saturation characteristics of the transistors concerned. The high voltage limit is set by the emitter-to-base break down voltage. In effect it is seen that the circuit of this invention is analogous to a plurality of switches in a bridge circuit or perhaps more precisely to a two-pole, double-throw switch having a switching frequency synchronized with the power frequency of the input power source.

It is obvious that many embodiments may be made of this inventive concept, and that many modifications may be made in the embodiments hereinbefore described. Therefore, it is to be understood that all descriptive matter herein is to be interpreted merely as illustrative, exemplary, and not in a limited sense.

What is claimed is:
1. A transistor network for converting an input electrical signal into a direct current output signal comprising:
   a bridge type network having input terminals adapted to receive said input signal and output terminals, said bridge network arranged to have four arms to selectively conduct current from said input terminals to said output terminals;
   a pair of first transistors of one conductivity type each having base, emitter and collector electrodes;
   a pair of second transistors of another conductivity type opposite said one type each having base, emitter, and collector electrodes;
   conductive means connecting a different one of said transistors to form each of said arms of said bridge network;
   the emitter electrodes of each of said transistors each being connected to one of said input terminals;
   the base electrodes of said transistors in opposite ones of said arms in said bridge being connected to different ones of said input terminals, thereby to control the conductivity of opposite arms of said bridge in accordance with the polarity of said input signal.

2. The transistor network according to claim 1 which also includes:
   a source of potential connected to said input terminals;
   a load device connected to said output terminals;
   the transistors in opposite ones of said arms in said bridge being of opposite conductivity types, thereby to complete alternate conductive paths through the said load.

3. The transistor network according to claim 2 in which said conductive means connects respective ones of said collector electrodes to said output terminals.

4. The transistor network according to claim 3 in which the emitter electrodes of said transistors in opposite ones of said arms in said bridge are connected to different ones of said input terminals.

5. The transistor network according to claim 2 in which impedance means comprises the connection between said base electrodes and said input terminals.

References Cited

UNITED STATES PATENTS

| 2,821,639 | 1/1958 | Bright et al. | 307—88.5 |
| 2,912,634 | 11/1959 | Peoples | 321—44 XR |
| 3,030,590 | 4/1962 | Fougere et al. | 331—113 |
| 3,233,161 | 2/1966 | Sikorra | 321—45 XR |
| 3,299,370 | 1/1967 | Massey | 331—113 |

FOREIGN PATENTS 851,375   10/1960   Great Britain.

OTHER REFERENCES

RCA Technical Notes, RCA TN No. 627, August 1965, 321–47.

JOHN F. COUCH, *Primary Examiner.*

W. M. SHOOP, JR., *Assistant Examiner.*

U.S. Cl. X.R.

321—47; 307—255